(12) United States Patent
Im et al.

(10) Patent No.: US 11,544,912 B2
(45) Date of Patent: Jan. 3, 2023

(54) CLOUD VR DEVICE FOR MOTION-TO-PHOTON (MTP) LATENCY REDUCTION

(71) Applicant: Immersivecast Co., Ltd., Seongnam-si (KR)

(72) Inventors: Jong Hyeock Im, Suwon-si (KR); Seung In Nam, Yongin-si (KR); Jae Hyeon Joo, Suwon-si (KR); Jang Hee Han, Seongnam-si (KR)

(73) Assignee: Immersivecast Co., Ltd., Seongnam-si (KR)

( * ) Notice: Subject to any disclaimer, the term of this patent is extended or adjusted under 35 U.S.C. 154(b) by 0 days.

(21) Appl. No.: 17/400,637

(22) Filed: Aug. 12, 2021

(65) Prior Publication Data

US 2022/0284681 A1    Sep. 8, 2022

(30) Foreign Application Priority Data

Mar. 3, 2021  (KR) .......................... 10-2021-0028197

(51) Int. Cl.
*G06T 19/00* (2011.01)
*G06F 3/01* (2006.01)
*G06F 3/0346* (2013.01)
*G02B 27/01* (2006.01)

(52) U.S. Cl.
CPC ........ *G06T 19/006* (2013.01); *G02B 27/0101* (2013.01); *G02B 27/017* (2013.01); *G02B 27/0179* (2013.01); *G06F 3/011* (2013.01); *G06F 3/017* (2013.01); *G06F 3/0346* (2013.01); *G02B 2027/014* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 10,254,544 B1* | 4/2019 | Melzer | G02B 27/017 |
| 2007/0255850 A1* | 11/2007 | Gould | H04L 67/62 709/240 |
| 2015/0363976 A1* | 12/2015 | Henson | H04N 13/344 345/419 |
| 2017/0018121 A1* | 1/2017 | Lawson | G06T 19/006 |
| 2017/0115488 A1* | 4/2017 | Ambrus | G02B 27/0172 |
| 2020/0097006 A1* | 3/2020 | Liu | G05D 1/0088 |
| 2021/0150833 A1* | 5/2021 | Koo | G06T 7/20 |

FOREIGN PATENT DOCUMENTS

| | | | |
|---|---|---|---|
| KR | 10-0820132 B1 | 4/2008 | |
| WO | WO-2014194135 A1 * | 12/2014 | G02B 27/0093 |

* cited by examiner

*Primary Examiner* — Jwalant Amin
(74) *Attorney, Agent, or Firm* — Paratus Law Group, PLLC

(57) ABSTRACT

Disclosed is a cloud VR device for MTP latency reduction. The cloud VR device includes a movement start detection unit detecting a movement start of a client virtual reality (VR) terminal, a Judder improvement unit predicting an orientation of the client VR terminal according to the movement start and providing the predicted orientation to a cloud VR server, a video encoding processing unit encoding a video image according to the predicted orientation through the cloud VR server and receiving the encoded video image, and a video image playback unit playing the encoded video image through the client virtual reality (VR) terminal.

7 Claims, 9 Drawing Sheets

① Canvas location movement by user's orientation Movement in 3 DoF (rolling, pitching, yawing)

② Canvas location movement by user's positioning Movement in 6 DoF (Left, Right, Up, Down)

CLOUD VR DEVICE FOR MOTION-TO-PHOTON (MTP) LATENCY REDUCTION

CROSS-REFERENCE TO RELATED APPLICATION

This application claims priority to and the benefit of Korean Patent Application No. 10-2021-0028197 filed on Mar. 3, 2021, which is hereby incorporated by reference in its entirety.

BACKGROUND

The present disclosure relates to a cloud VR technology, and more particularly, to a cloud VR device for motion-to-photon (MTP) latency reduction capable of improving problems caused by a time difference that occurs while information generated from a user is being transmitted back to the user via a cloud system.

Recently, virtual reality (VR) devices have appeared, but are not widely spread like smartphones due to problems such as high price, low resolution that hinders a sense of immersion, and a lack of VR content.

In particular, physical discomfort such as dizziness that may occur due to a discrepancy between a user's head movement and a visible VR video may be a problem that needs to be resolved.

To solve this problem, motion-to-photon (MTP) redundancy needs to be reduced to be within 10 to 20 ms. To achieve this, there are technical difficulties in a wireless environment (for example, WiFi, mobile network, or the like).

RELATED ART DOCUMENT

Patent Document

Korean Patent No. 10-0820132 (2009 Apr. 1)

SUMMARY

The present disclosure provides a cloud VR device for MTP latency reduction capable of improving problems caused by a time difference that occurs while information generated from a user is being transmitted back to the user via a cloud system.

The present disclosure provides a cloud VR device capable of improving a black edge phenomenon and implementing fast MTP latency by predicting a client orientation according to latency and transmitting the predicted client orientation to a server while immediately reflecting a user movement signal to image rendering.

In an aspect, a cloud VR device for MTP latency reduction includes a movement start detection unit detecting a movement start of a client virtual reality (VR) terminal, a Judder improvement unit predicting an orientation of the client VR terminal according to the movement start and providing the predicted orientation to a cloud VR server, a video encoding processing unit encoding a video image according to the predicted orientation through the cloud VR server and receiving the encoded video image, and a video image playback unit playing the encoded video image through the client virtual reality (VR) terminal.

The movement start detection unit may detect the movement of the client VR terminal through N (N is a natural number) degree of freedom (DoF) tracking sensors.

The movement start detection unit may detect the movement of the client VR terminal through movement tracking of a user's head by positioning the N degree of freedom (DoF) tracking sensors outside the client VR terminal.

The Judder improvement unit may obtain an angular velocity through N DoF tracking sensors during the movement start and predict an orientation of a user's head according to an MTP latency time based on the angular velocity.

The Judder improvement unit may dynamically adjust the MTP latency time by determining a difference between the predicted orientation and the actual orientation of the user's head at a point in time according to the MTP latency time.

The Judder improvement unit may detect an angular inflection point of the angular velocity using an angular acceleration through the N DoF tracking sensors, and generate calibrated orientation information of the user's head according to the detection of the angular inflection point.

The video encoding processing unit may provide the angular velocity and the angular acceleration according to the predicted orientation to the cloud VR server, and the cloud VR server may determine encoding urgency of the video image to encode the video image.

The video image playback unit may perform a calibration and foveated rendering on a video image portion in an actual orientation in the encoded video image when a difference between the predicted orientation and the actual orientation of the user's head during the playback is equal to or greater than a specific reference.

DETAILED DESCRIPTION

Figure 1:
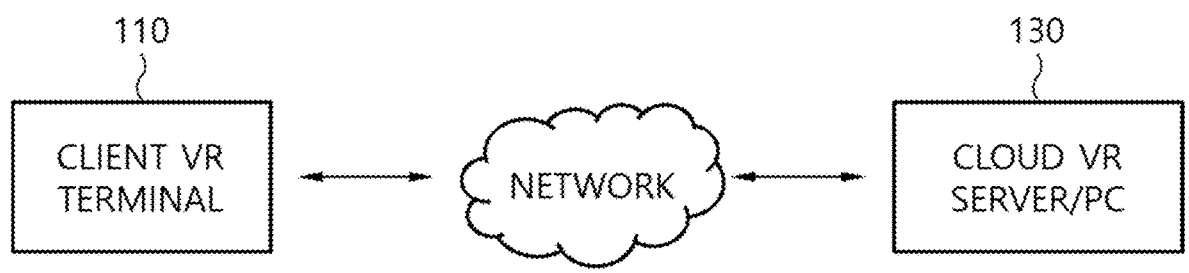
FIG. 1 is a diagram for describing a cloud VR system according to the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. In addition, other expressions describing a relationship between components, that is, "between", "directly between", "neighboring to", "directly neighboring to" and the like, should be similarly interpreted.

It should be understood that the singular expression include the plural expression unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In each step, an identification code (for example, a, b, c, and the like) is used for convenience of description, and the identification code does not describe the order of each step, and each step may be different from the specified order unless the context clearly indicates a particular order. That is, the respective steps may be performed in the same sequence as the described sequence, be performed at substantially the same time, or be performed in an opposite sequence to the described sequence.

The present disclosure can be embodied as computer readable code on a computer readable recording medium, and the computer readable recording medium includes all types of recording devices in which data can be read by a computer system. Examples of the computer readable recording medium may include a read only memory (ROM), a random access memory (RAM), a compact disk read only memory (CD-ROM), a magnetic tape, a floppy disk, an optical data storage, or the like. In addition, the computer readable recording medium may be distributed in computer systems connected to each other through a network, such that the computer readable codes may be stored in a distributed scheme and executed.

Unless defined otherwise, all the terms used herein including technical and scientific terms have the same meaning as meanings generally understood by those skilled in the art to which the present disclosure pertains. It should be understood that the terms defined by the dictionary are identical with the meanings within the context of the related art, and they should not be ideally or excessively formally defined unless the context clearly dictates otherwise.

The cloud VR device for MTP latency reduction according to the present disclosure may correspond to a device that may minimize dizziness while providing realistic VR/AR images to a user by effectively reflecting an orientation change according to user movement. The cloud VR device for MTP latency reduction may provide a user with realistic images synchronized with user's actual movement by utilizing user movement information that may be obtained from various sensors mounted or attached to a user's body.

Therefore, the cloud VR device for MTP latency reduction may realize optimized MTP latency by improving an image Judder phenomenon or the like that existing VR devices have in the cloud environment while providing realistic images to a user.

Hereinafter, a detailed configuration and operation of the present disclosure will be described in detail with reference to FIGS. 1 to 7.

FIG. 1 is a diagram for describing a cloud VR system according to the present disclosure.

Referring to FIG. 1, a cloud VR system 100 may include a client VR terminal 110 and a cloud VR server/PC 130.

The client VR terminal 110 may correspond to a user terminal capable of playing AR/VR images. For example, the client VR terminal 110 may be typically implemented with an HMD, a VR/AR glasses, etc., but is not limited thereto, and may be implemented with various devices capable of reproducing AR/VR images. The client VR terminal 110 may be connected to the cloud VR server/PC 130 through a network to exchange data.

In one embodiment, the client VR terminal 110 may be implemented including a cloud VR device according to the present disclosure. In this case, the cloud VR device according to the present disclosure may correspond to a dedicated application executed on the client VR terminal 110. That is, the cloud VR device according to the present disclosure may be an independent module that performs a predetermined function, and may be implemented by being included in the client VR terminal 110, and may interwork with the cloud VR server/PC 130 to perform a specific operation of MTP latency reduction according to the present disclosure.

In addition, when the cloud VR device according to the present disclosure is implemented by being included in the client VR terminal 110, some operations may be implemented by being included in the cloud VR server/PC 130. For example, the operation of encoding the video image may be performed in the cloud VR server/PC 130, and the client VR terminal 110 may perform an operation of receiving and playing the video image encoded by the cloud VR server/PC 130.

In one embodiment, the client VR terminal 110 may be implemented to include a 6 degrees of freedom (DoF) sensor for user movement information. In addition, the client VR terminal 110 may be implemented by further including various sensors as necessary. For example, the client VR terminal 110 may further include a GPS sensor, a motion sensor, and the like. In another embodiment, the client VR terminal 110 may receive the user movement information from the 6 DoF sensor operating outside. In this case, the 6 DoF sensor may operate by being included in the 6 DoF tracking device interworking with the client VR terminal 110.

The cloud VR server/PC 130 may be implemented as a server corresponding to a computer or program that generates the AR/VR images played in the client VR terminal 110 and transmits the generated AR/VR images through a network. The cloud VR server/PC 130 may be connected to the client VR terminal 110 through a wireless network such as Bluetooth, WiFi, and 5G communication, and may transmit/receive data to and from the client VR terminal 110 through the network.

In addition, the cloud VR server/PC 130 may receive 6 DoF signals as the user movement information from the client VR terminal 110, generate and capture the corresponding frame based on the received 6 DoF signals, encode the video, and then transmit the encoded video to the client VR terminal 110 again. To this end, the cloud VR server/PC 130 may install and execute a remote application that operates by interworking with the client VR terminal 110.

Figure 2:
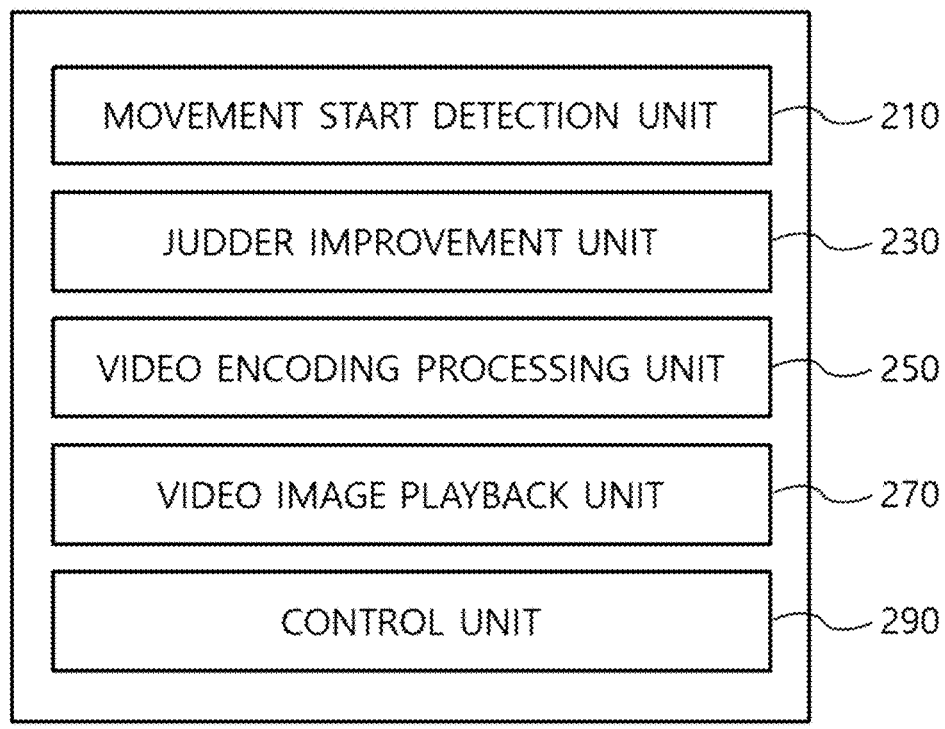
FIG. 2 is a diagram for describing a functional configuration of a cloud VR device according to the present disclosure.

FIG. 2 is a diagram for describing a functional configuration of a cloud VR device according to the present disclosure.

Referring to FIG. 2, the cloud VR device 200 includes a movement start detection unit 210, a Judder improvement unit 230, a video encoding processing unit 250, a video image playback unit 270, and a control unit 290. In one embodiment, each functional component constituting the cloud VR device 200 may be implemented by being included in the client VR terminal 110 or the cloud VR server/PC 130, and may be organically coupled by inter-working between the client VR terminal 110 and the cloud VR server/PC 130.

The movement start detection unit 210 may detect a movement start of the client virtual reality (VR) terminal 110. That is, when the movement start of the client VR terminal 110 is detected, the movement start detection unit 210 may determine that the user movement has occurred, and may perform the related operations to respond to the user movement. Basically, the movement start detection unit 210 may directly detect the movement start by interworking with various sensors included in the client VR terminal 110, and in some cases, independently interwork the sensors attached or mounted on a user's body to indirectly detect the movement start of the client VR terminal 110.

In an embodiment, the movement start detection unit 210 may detect the movement of the client VR terminal 110 through N (where N is a natural number) degree of freedom (DoF) tracking sensor. Here, the N DoF tracking sensor may basically correspond to a 6 DoF sensor, but is not limited thereto, and may include a 2 DoF sensor, a 3 DoF sensor, a 9 DoF sensor, and the like. The movement start detection unit 210 may receive the N DoF signals from the client VR terminal 110, and may detect the movement start of the client VR terminal 110 by monitoring the change in the N DoF signals.

In an embodiment, the movement start detection unit 210 may position the N DoF tracking sensor outside the client VR terminal 110 to detect the movement of the client VR terminal 110 through the movement tracking of the user's head. The N DoF tracking sensor may be installed and operated not only inside the client VR terminal 110 but also outside, and when the N DoF tracking sensor is installed outside, the movement start detection unit 210 may track the movement of the user's head based on the N DoF signals. That is, the movement start detection unit 210 may detect the movement of the client VR terminal 110 based on the change in the movement of the user's head. In this case, the movement start detection unit 210 may receive tracking information on the movement of the user's head from the N DoF tracking sensor.

The Judder improvement unit 230 may predict an orientation of the client VR terminal 110 according to the movement start of the client VR (Virtual Reality) terminal 110 and provide the predicted orientation to the cloud VR server 130. That is, the Judder improvement unit 230 may basically transmit a current orientation of the client VR terminal 110 to the cloud VR server 130 in every frame, and in order to optimize the MTP latency, predict the orientation of the client VR according to the MTP latency in every frame and transmit the predicted orientation to the cloud VR server 130. In this case, the orientation prediction of the client VR terminal 110 may be determined based on the current movement as the predicted orientation when the corresponding movement is maintained for a time according to the MTP latency.

In one embodiment, the Judder improvement unit 230 may predict the orientation of the user's head according to the MTP latency time based on an angular velocity and an angular velocity through the N DoF tracking sensor during the movement start. The Judder improvement unit 230 may obtain the angular velocity and the angular acceleration related to the movement of the client VR terminal 110, and when the angular velocity continues for the MTP latency time, may calculate the orientation of the user's head.

In an embodiment, the Judder improvement unit 230 may dynamically adjust the MTP latency time by determining a difference between the predicted orientation and the actual orientation of the user's head at a point in time according to the MTP latency time. The Judder improvement unit 230 may perform the orientation prediction based on the angular velocity and the MTP latency time, but when an error occurs between the predicted orientation and the actual orientation, calibrate the MTP latency time used for the orientation prediction according to the error to improve the accuracy of the orientation prediction.

In particular, the Judder improvement unit 230 may compare the difference between the predicted orientation and the actual orientation with a threshold value and may perform the calibration for the MTP latency time when the threshold value is exceeded. In addition, the Judder improvement unit 230 may perform the calibration for the MTP latency time only when the case in which the prediction result exceeds the corresponding threshold continuously occurs, and may dynamically set the number of consecutive times of error occurrence in consideration of performance, a network speed, and the like of each of the client VR terminal 110 and the cloud VR server 130.

In one embodiment, the judder improvement unit 230 may detect an angular inflection point of the angular velocity through the N DoF tracking sensor and generate the calibrated orientation information of the user's head according to the detection of the angular inflection point. Here, the angular inflection point may indicate the change in orientation based on the angular velocity. That is, the Judder improvement unit 230 may be immediately reflected in the prediction operation by generating the calibrated orientation information of the user's head at the time when the change in orientation of the user's head is detected during the orientation prediction based on the angular velocity.

The video encoding processing unit 250 may encode a video image according to the predicted orientation through the cloud VR server 130 and receive the encoded video image. The video image to which the orientation prediction result is reflected may be generated through the cloud VR server 130, and an encoding operation may be performed in order to reduce a network load before transmission to the client VR terminal 110. The video encoding processing unit 250 may process information necessary for an image encoding operation by interworking with the cloud VR server 130, and may process reception of an encoded video image together.

In one embodiment, the video encoding processing unit 250 provides the angular velocity according to the predicted orientation to the cloud VR server 130 so that the cloud VR server 130 may determine the encoding urgency of the video image to encode the video image. That is, the cloud VR server 130 that processes the image encoding may determine the encoding urgency of the video image by adaptively responding to the user movement. For example, when the user movement is fast, the encoding of the video image may be immediately processed, so the image playback according to the change in orientation may be quickly processed. On the contrary, even if the encoding of the video image is processed relatively slowly, the real-time quality of the image perceived by the user may be maintained at a certain level.

The video image playback unit 270 may play the encoded video image through the client VR terminal 110. The video image playback unit 270 may receive the encoded video image from the cloud VR server 130, decode the received image through the client VR terminal 110, and then play the decoded image. In particular, the cloud VR server 130 may transmit the encoded image to the client VR terminal 110 through video streaming, and the video image playback unit 270 may decode the encoded image, perform texture mapping, and then play a video image optimized for MTP latency through canvas rendering.

In an embodiment, the video image playback unit 270 may perform a calibration and foveated rendering on the encoded video image as the video image in the actual orientation during the canvas rendering when the difference between the predicted orientation of the user's head and the actual orientation is greater than or equal to a certain criterion during the playback. The video image playback unit 270 may decode the encoded video image and perform the calibration on the video image during the rendering based on the actual orientation when it is determined that the difference between the actual orientation and the predicted orientation of the user's head is greater than or equal to a preset specific criterion during the decoding. In addition, the foveated rendering in which the video image is generated by performing high-resolution texture mapping on a predetermined region based on the actual orientation and performing low-resolution texture mapping on the remaining region may be performed.

In an embodiment, the video image playback unit 270 may perform the calibration on the video image during the rendering based on the actual orientation, and dynamically determine the size of the region rendered with the high resolution during the foveated rendering based on the difference between the predicted orientation and the actual orientation. For example, as the difference between the predicted orientation and the actual orientation increases, the size of the region rendered with the high resolution may decrease.

The control unit 290 may control the overall operation of the cloud VR device 200, and manage a control flow or a data flow between a movement start detection unit 210, a Judder improvement unit 230, a video encoding processing unit 250, and a video image playback unit 270.

Figure 3:
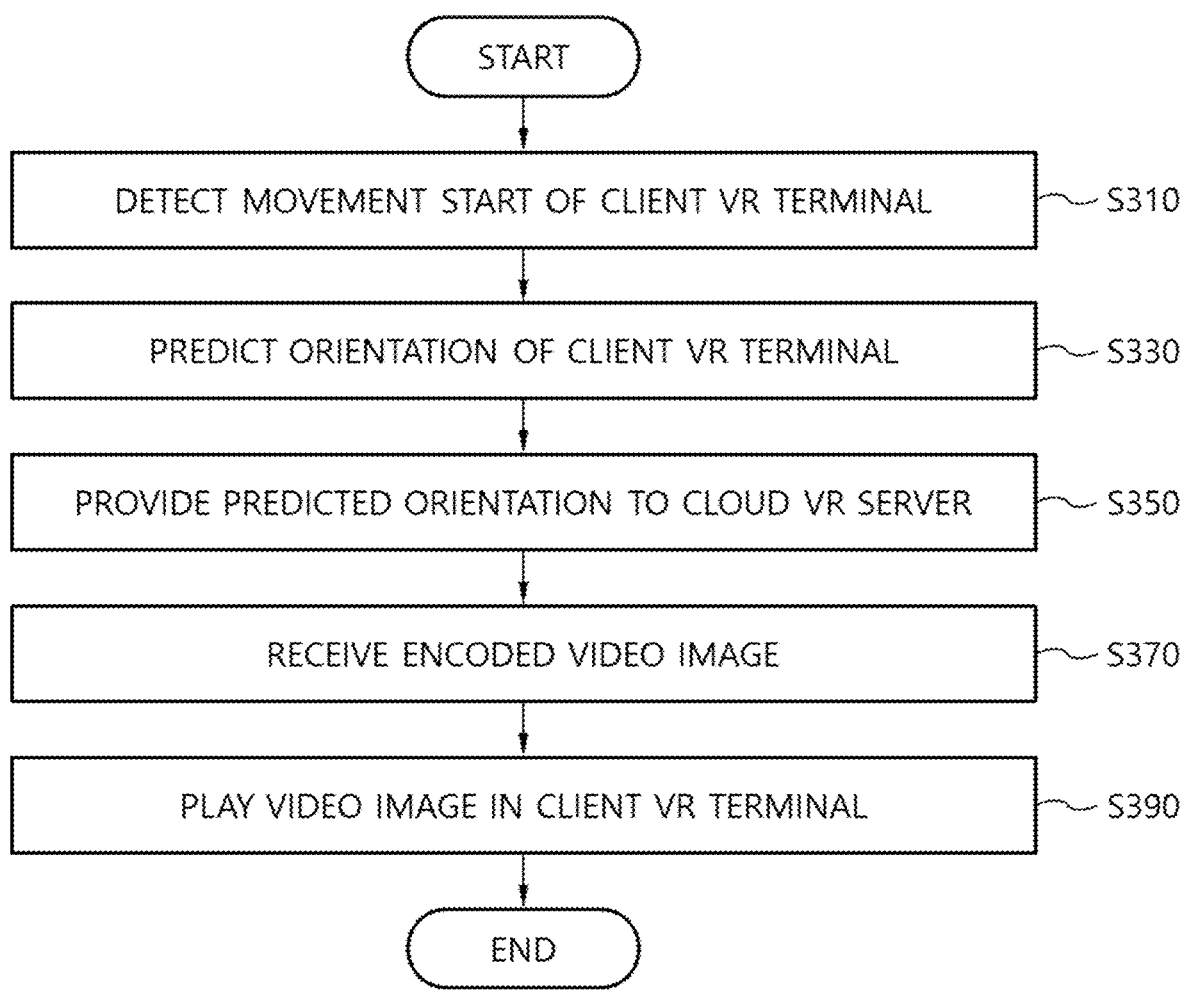
FIG. 3 is a flowchart for describing a process of providing cloud VR according to the present disclosure.

FIG. 3 is a flowchart for describing a process of providing cloud VR according to the present disclosure.

Referring to FIG. 3, the cloud VR device 200 may detect the movement start of the client virtual reality (VR) terminal through the movement start detection unit 210 (step S310). The cloud VR device 200 may predict the orientation of the client VR terminal 110 according to the movement start of the client VR terminal 110 through the Judder improvement unit 230, and provide the predicted orientation to the cloud VR server 130 (steps S330 and S350).

In addition, the cloud VR device 200 may receive the video image encoded in the orientation predicted by the cloud VR server 130 through the video encoding processing unit 250 (step S370). The cloud VR device 200 may be encoded by the video image playback unit 270 and play the received video image by the client virtual reality (VR) terminal 110 (step S390).

Figure 4A:
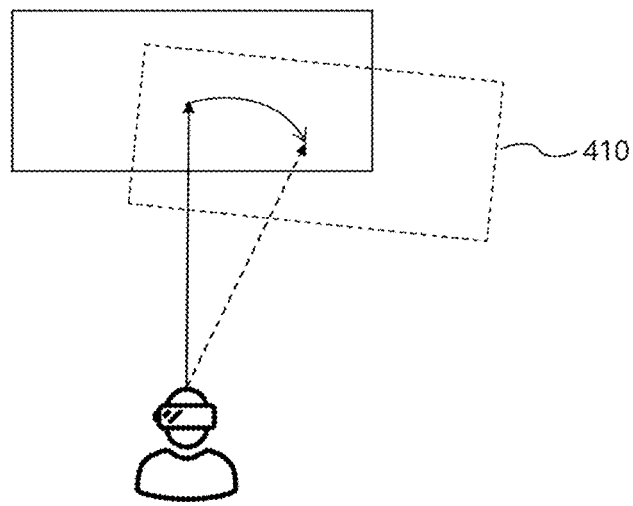
FIGS. 4A, 4B and 4C are diagrams for describing a canvas location movement according to the present disclosure.
Figure 4B:
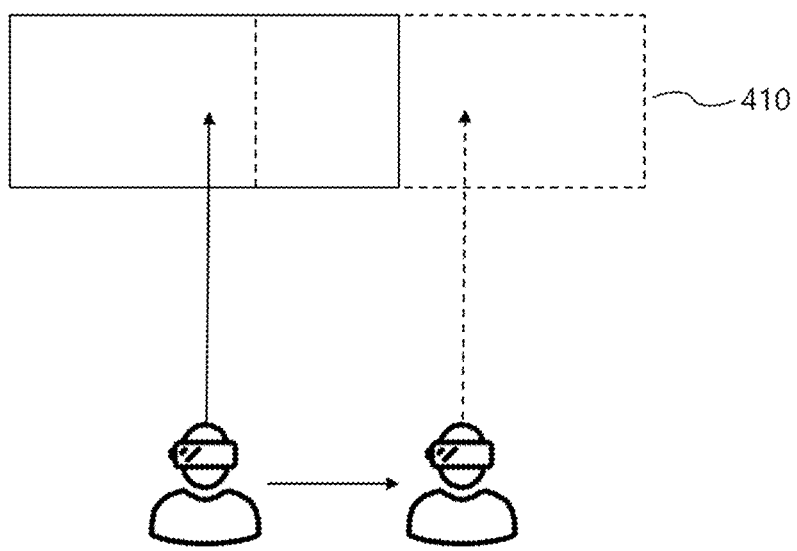
Figure 4C:
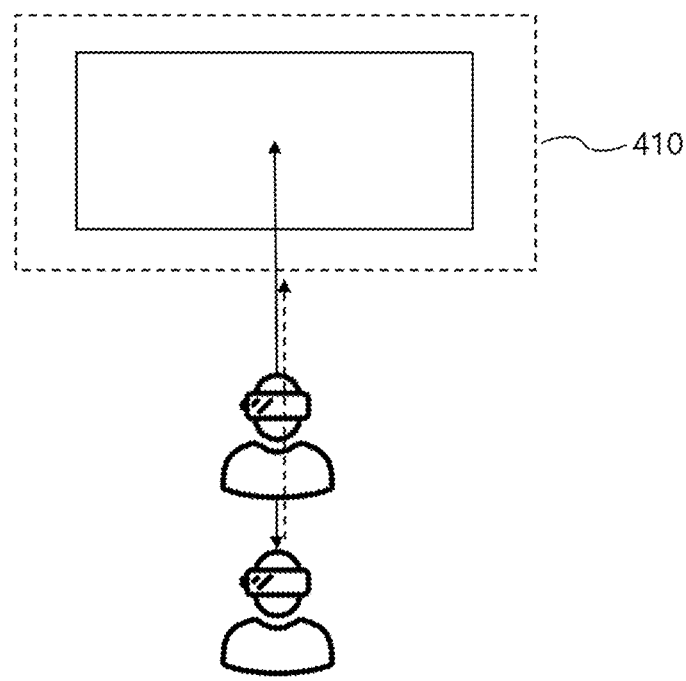

FIGS. 4A, 4B and 4C are diagrams for describing a canvas location movement according to the present disclosure.

Referring to FIGS. 4A, 4B and 4C, the cloud VR system 100 may provide a video image played in the client VR terminal 110 by the interworking between the cloud VR server 130 and the client VR terminal 110. In this case, various DoF sensors may be used to provide the video image adaptively responding to the user's movement.

In the case of FIG. 4A, the location of the canvas 410 may be adjusted according to the orientation movement of the user's head based on 3 DoF signals. In this case, the 3 DoF signals may be used for pitching in an X-axis orientation, yawing in a Y-axis orientation, and rolling in a Z-axis orientation around the user's head. That is, the orientation of the canvas 410 may also be rotated according to the rotation orientation of the user's head.

In the case of FIG. 4B, the location of the canvas 410 may be adjusted according to the movement of the user's head in the up, down, left, and right orientations based on the 6 DoF signals. In this case, left, right, up, and down information among the 6 DoF signals may be utilized, and the location of the canvas 410 may move up, down, left, and right in response to the up, down, left, and right movement of the user's position.

In the case of FIG. 4C, it is possible to adjust the canvas size according to the movement of the user's head in the forward and backward orientations based on the 6 DoF signals. In this case, forward and backward information among the 6 DoF signals may be utilized, and the size of the canvas 410 may be enlarged or reduced in response to the forward and backward movement of the user's location. That is, when the user's location moves backward, the size of the canvas 410 shown to the user may be enlarged.

Figure 5A:
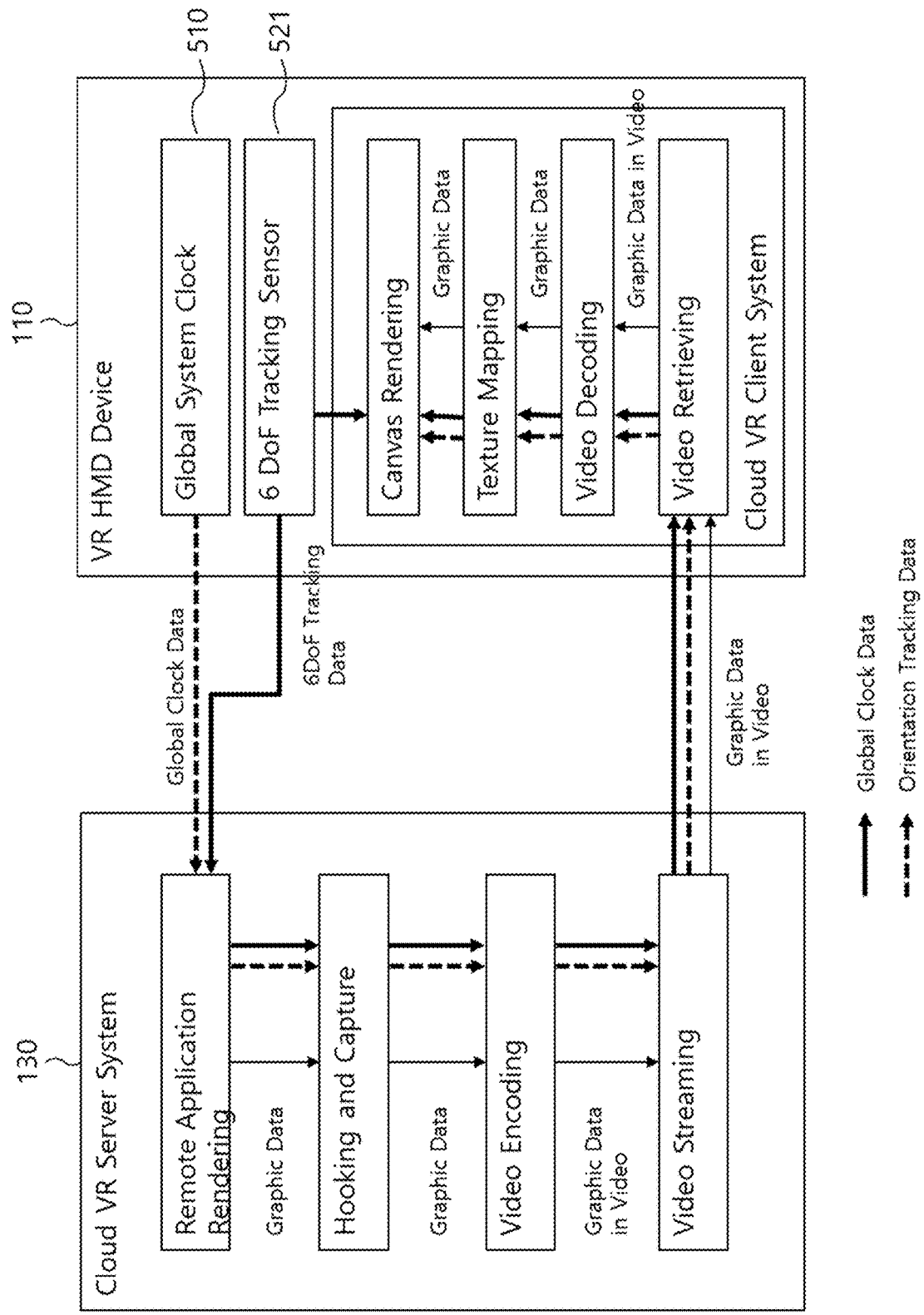
FIGS. 5A, 5B and 5C are diagrams for describing examples of MTP latency reduction according to the present disclosure.
Figure 5B:
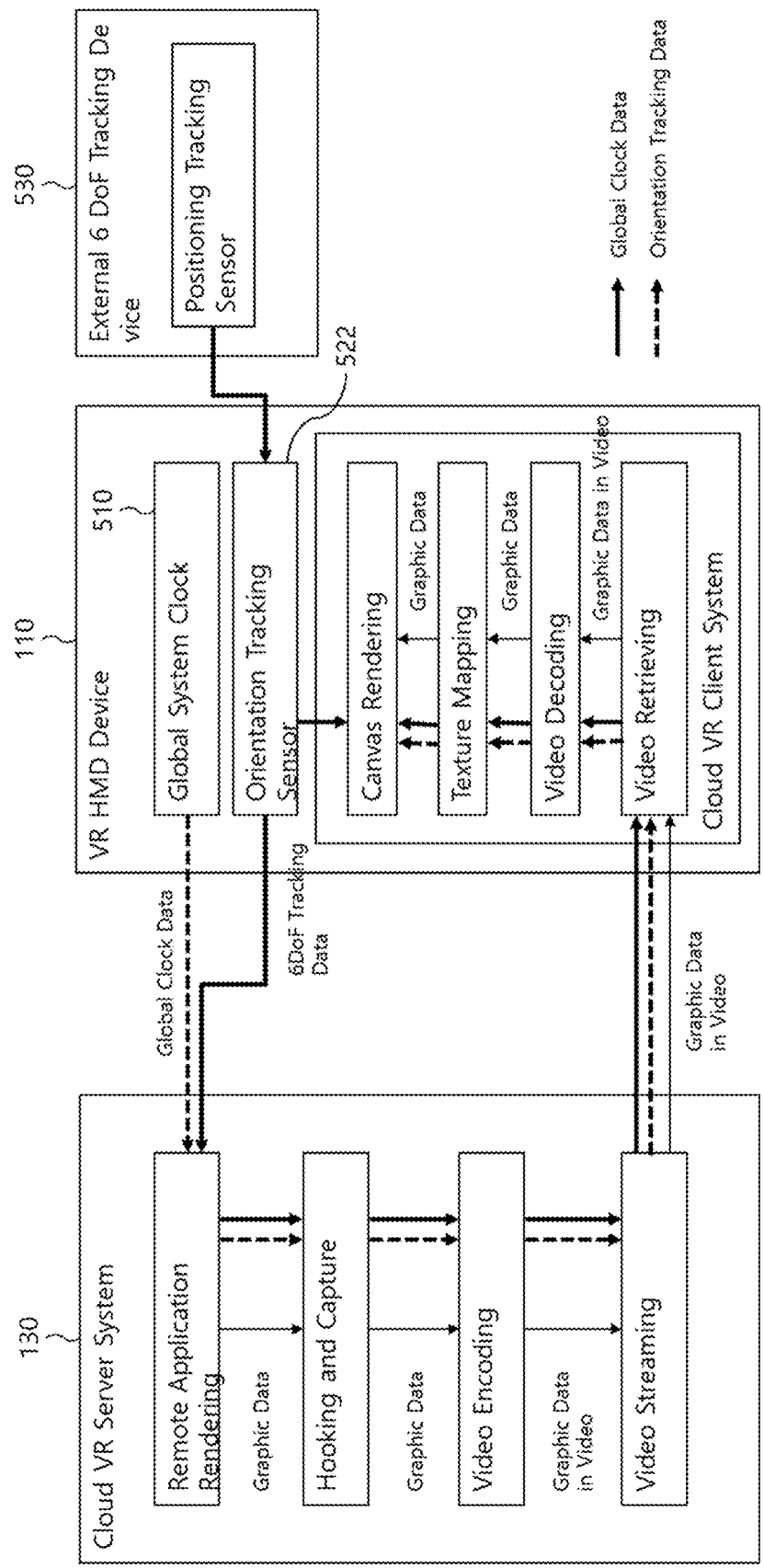
Figure 5C:
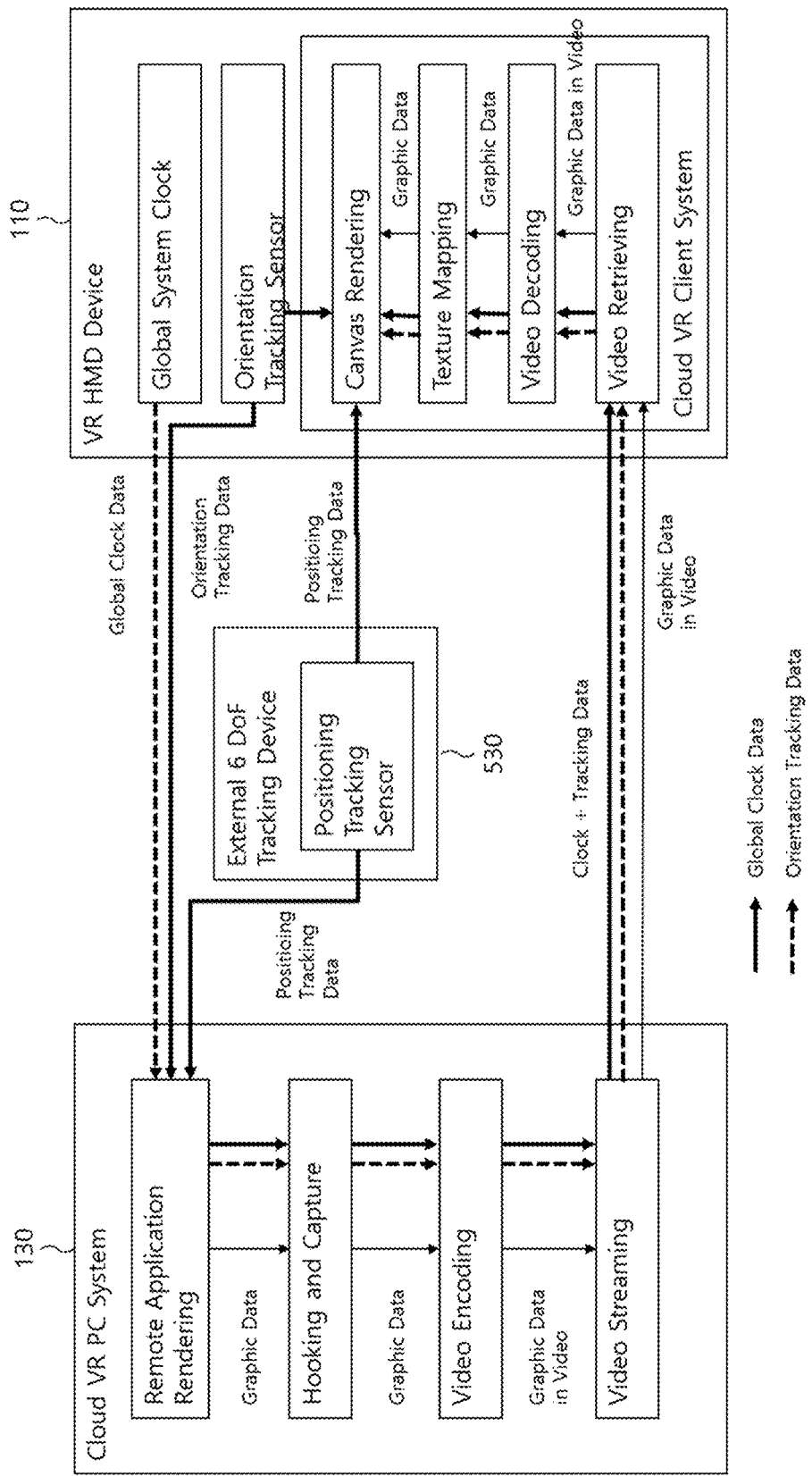

FIGS. 5A, 5B and 5C are diagrams for describing examples of the MTP latency reduction according to the present disclosure.

Referring to FIGS. 5A, 5B and 5C, the cloud VR system 100 may provide the video image played in the client VR terminal 110 by the interworking between the cloud VR server 130 and the client VR terminal 110. In this case, the cloud VR system 100 may effectively reduce the MTP latency by immediately reflecting and updating the canvas rendering of the video image when a signal related to user movement is detected.

In addition, the cloud VR system 100 may transmit a signal related to user movement from the client VR terminal 110 to the cloud VR server 130 together with global clock data, and the cloud VR server 130 may map the corresponding global clock data to a frame output during the video encoding and then transmit the mapped data to the client VR terminal 110 through the network, thereby effectively solving the image Judder phenomenon caused by the MTP latency occurring in the client VR terminal 110.

That is, the client VR terminal 110 may decode the encoded video image received from the cloud VR server 130 and then apply the corresponding global clock data together with the information on the user movement during the texture mapping on the canvas, thereby reducing the phenomenon of screen shaking such as the image Judder.

In the case of FIG. 5A, the client VR terminal 110 may be implemented by itself including a 6 DoF tracking sensor 521. The 6 DoF tracking sensor 521 may detect the movement of the client VR terminal 110 according to the user's movement, and may generate 6 DoF tracking data as movement information. The client VR terminal 110 may directly transmit the tracking data of the 6 DoF tracking sensor 521 to the cloud VR client system, which is the local application, and the cloud VR client system may adaptively adjust the location and size of the canvas using the tracking data.

On the other hand, the cloud VR client system may play video image immediately responding to the user's movement through each step of video retrieving, video decoding, texture mapping, and canvas rendering. In addition, each step for video image playback may be implemented as a module that performs an independent function.

In addition, the client VR terminal 110 may acquire time information according to the occurrence of the user's movement based on an internal global system clock 510 and transmit the time information to the cloud VR server 130. The cloud VR server 130 may generate the video image adaptively responding to the user's movement through each step of remote application rendering, hooking and capture, video encoding, and video streaming and provide the generated video image to the client VR terminal 110. Meanwhile, the cloud VR server 130 may be implemented including independent modules that perform each step of remote application rendering, hooking and capture, video encoding, and video streaming.

In the case of FIG. 5B, the client VR terminal 110 may be implemented by itself including a 3 DoF tracking sensor (orientation tracking sensor) 522, and may receive information collected through a positioning tracking sensor of an external 6 DoF tracking device 530 and generate the 6 DoF tracking data as the movement information on the user's movement. For example, the 6 DoF tracking device 530 may be implemented as a wearable device, operate by being attached to the user's body, and connected to the client VR terminal 110 through short-range communication. Thereafter, the tracking data generated by the 3 DoF tracking sensor (orientation tracking sensor) 522 may be transmitted and used during the canvas rendering process of the cloud VR client system.

In the case of FIG. 5C, the client VR terminal 110 may be implemented by itself including the 3 DoF tracking sensor (orientation tracking sensor) 522, and may receive information collected through the positioning tracking sensor of the external 6 DoF tracking device 530. In this case, the location tracking data generated by the external 6 DoF tracking device 530 may be directly transmitted and used during the canvas rendering of the cloud VR client system, and the cloud VR client system may adjust the orientation and location movement of the canvas using the orientation tracking sensor of the 3 DoF tracking sensor (orientation tracking sensor) (522) and the positioning tracking data of the 6 DoF tracking device 530.

In addition, the external 6 DoF tracking device 530 may directly provide the positioning tracking information (Positioning Tracking Data) even to the cloud VR PC 130. That is, the cloud VR PC 130 may receive the positioning tracking data received from the 6 DoF tracking device 530 and the orientation tracking data received from the client VR terminal 110, respectively, and may apply the received positioning tracking data and orientation tracking data to a remote application rendering process. Thereafter, the global clock data and the tracking data related to the user movement may be reflected in the video encoding process of the cloud VR PC 130 and transmitted to the client VR terminal 110 through the video streaming.

Figure 6:
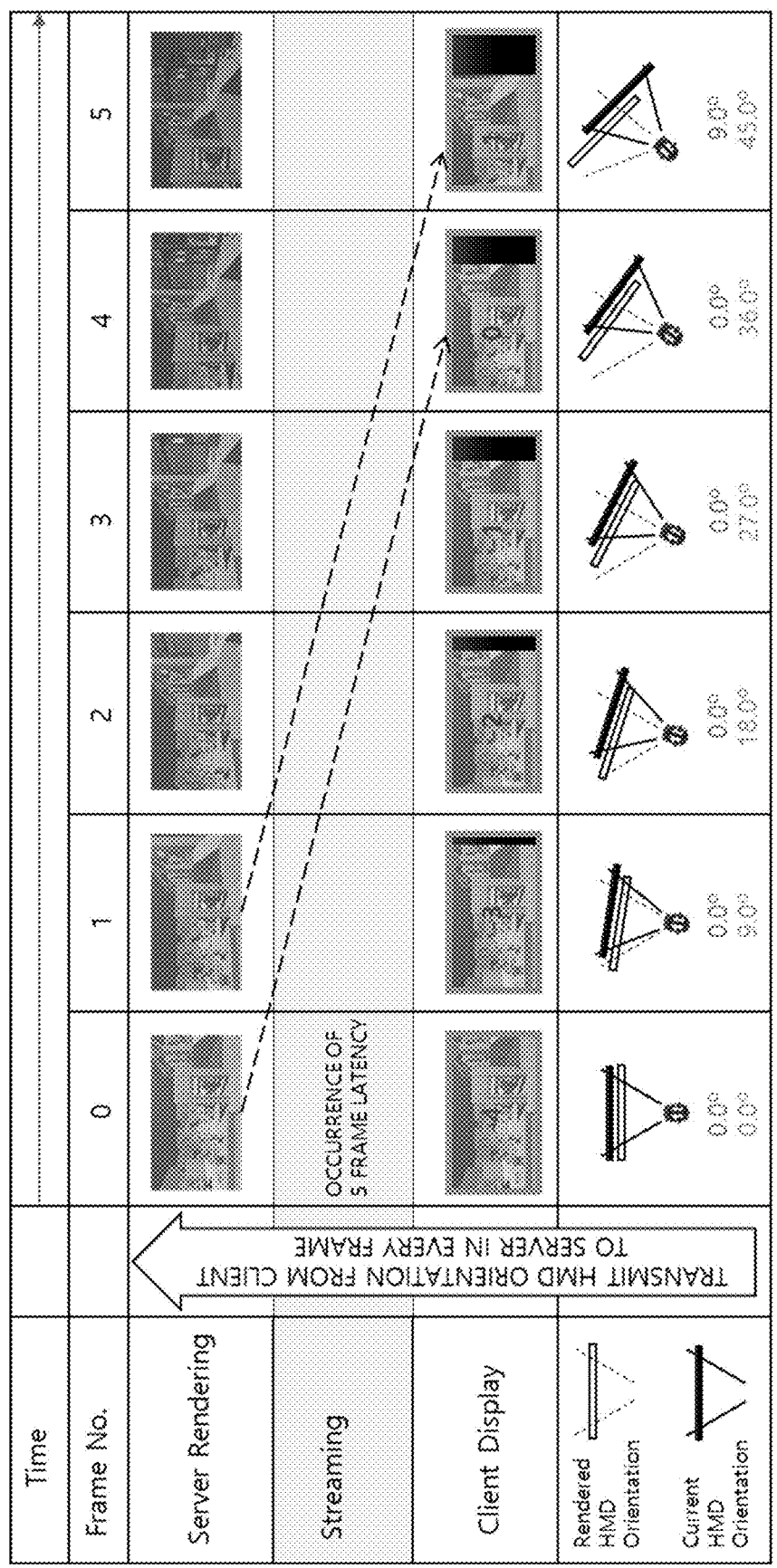
FIGS. 6 and 7 are diagrams for describing an effect of MTP latency reduction according to the present disclosure.
Figure 7:
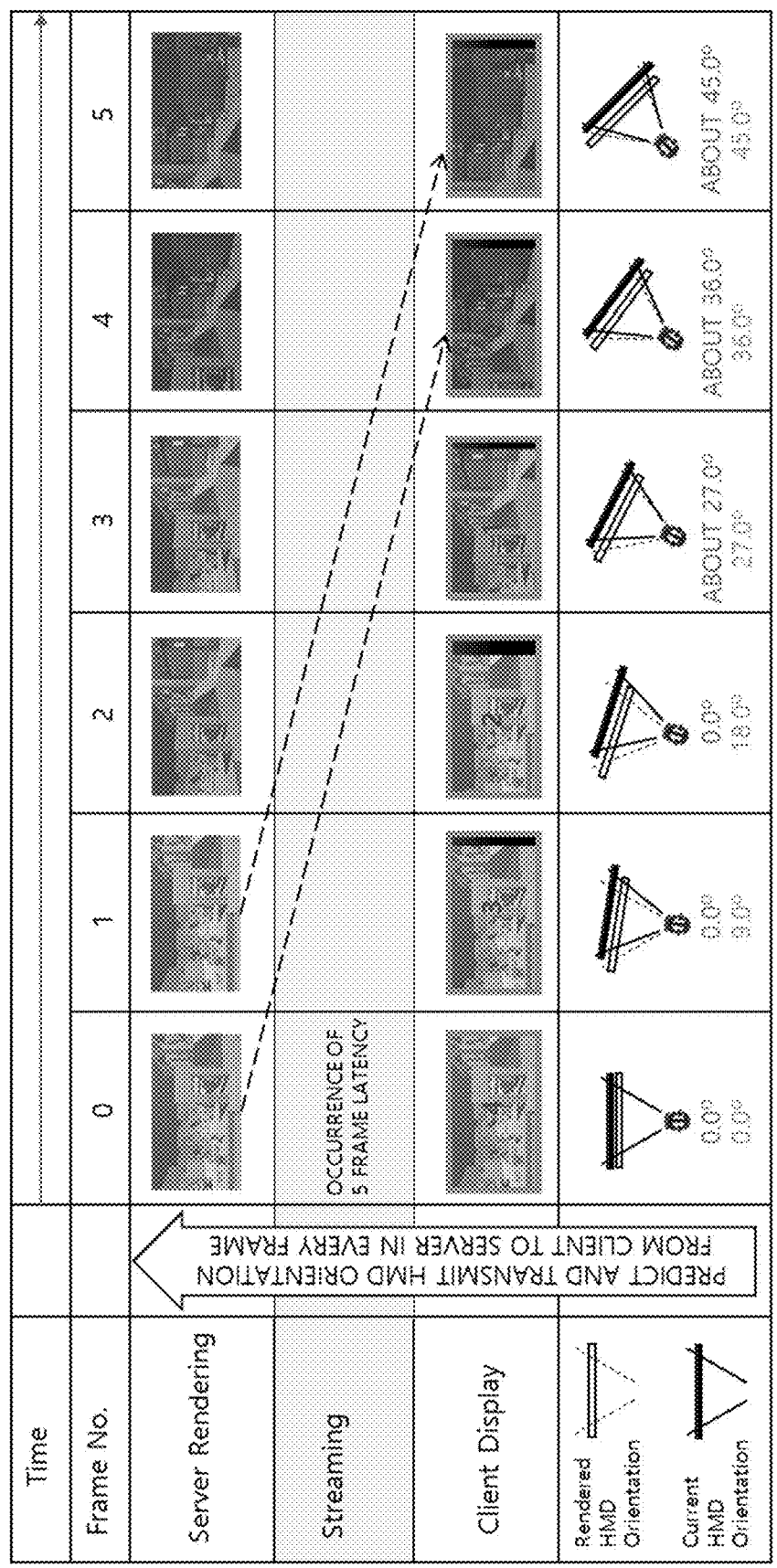

FIGS. 6 and 7 are diagrams for describing an effect of MTP latency reduction according to the present disclosure.

Referring to FIGS. 6 and 7, basically, the cloud VR system 100 may rotate the canvas according to the orientation of the received image to improve the image judder phenomenon that occurs in the client VR terminal 110 during the video playback. In FIG. 6, the video image streamed and played from the cloud VR server 130 to the client VR terminal 110 may have a latency interval of a total of 5 frames in total due to the MTP latency.

That is, it may take a time interval of 5 frames until the image rendered by the cloud VR server 130 is actually played on the client VR terminal 110. For example, the time when frame 0 is rendered on the server and then displayed through the screen of the client VR terminal 110 through the network may correspond to the time when frame 4 is processed on the server. Accordingly, when the image rendered by the server is played on the actual client VR terminal 110, the rotation of the canvas is delayed by 5 frame intervals, so a predetermined error may occur between the orientation of the actual terminal and the orientation of the canvas screen displayed, which may act as a cause of the image Judder phenomenon.

In FIG. 7, the cloud VR system 100 may predict the orientation of the client VR terminal 110 by reflecting the latency time in order to improve the black edge phenomenon, and then transmit the predicted orientation to the cloud VR server 130. That is, the cloud VR server 130 may improve the black edge phenomenon by rendering the screen in the rotated orientation according to the prediction information and transmitting the rendered screen to the client VR terminal 110 through the streaming. The client VR terminal 110 may minimize the error with the orientation of the actual terminal by rotating the canvas to the predicted orientation and then playing the streamed video image, thereby improving the black edge phenomenon.

As a result, the cloud VR system 100 may realize optimized MTP latency reduction by rendering the video according to the predicted orientation and playing the rendered video through the canvas rotated in the predicted orientation despite the absolute MTP latency caused by the network between the server and the client. The cloud VR system 100 according to the present disclosure (based on Local WIFI) can be reduced to less than 20 msec by more improving the existing MTP latency of 80 to 100 msec.

Although exemplary embodiments of the present invention have been disclosed hereinabove, it may be understood by those skilled in the art that the present invention may be variously modified and altered without departing from the scope and spirit of the present invention described in the following claims.

The disclosed technology can have the following effects. However, since a specific embodiment is not construed as including all of the following effects or only the following effects, it should not be understood that the scope of the disclosed technology is limited to the specific embodiment.

According to a cloud VR device for MTP latency reduction according to an embodiment of the present disclosure, it is possible to improve problems caused by a time difference that occurs while information generated from a user is being transmitted back to the user via a cloud system.

According to a cloud VR device for MTP latency reduction according to an embodiment of the present disclosure, it is possible to improve a black edge phenomenon and implement fast MTP latency by predicting a client orientation according to latency and transmitting the predicted client orientation to a server while immediately reflecting a user movement signal to image rendering.

What is claimed is:
1. A cloud VR device for motion-to-photon (MTP) latency reduction, comprising:

a movement start detection unit detecting a movement start of a client virtual reality (VR) terminal;

a Judder improvement unit predicting an orientation of the client VR terminal according to the movement start and providing the predicted orientation to a cloud VR server;

a video encoding processing unit encoding a video image according to the predicted orientation through the cloud VR server and receiving the encoded video image; and a video image playback unit playing the encoded video image through the client virtual reality (VR) terminal, wherein the video image playback unit performs a calibration and foveated rendering on a video image portion in an actual orientation in the encoded video image during canvas rendering when a difference between the predicted orientation and the actual orientation of the user's head during the playback is equal to or greater than a specific reference.

2. The cloud VR device of claim 1, wherein the movement start detection unit detects the movement of the client VR terminal through N (N is a natural number) degree of freedom (DoF) tracking sensors.

3. The cloud VR device of claim 2, wherein the movement start detection unit detects the movement of the client VR terminal through movement tracking of a user's head by positioning the N degree of freedom (DoF) tracking sensors outside the client VR terminal.

4. The cloud VR device of claim 1, wherein the Judder improvement unit obtains an angular velocity through N DoF tracking sensors during the movement start and predicts an orientation of a user's head according to an MTP latency time based on the angular velocity.

5. The cloud VR device of claim 4, wherein the Judder improvement unit dynamically adjusts the MTP latency time by determining a difference between the predicted orientation and an actual orientation of the user's head at a point in time according to the MTP latency time.

6. The cloud VR device of claim 1, wherein the video encoding processing unit provides an angular velocity and an angular acceleration according to the predicted orientation to the cloud VR server, and the cloud VR server determines encoding urgency of the video image to encode the video image.

7. A cloud VR device for motion-to-photon (MTP) latency reduction, comprising:

a movement start detection unit detecting a movement start of a client virtual reality (VR) terminal;

a Judder improvement unit predicting an orientation of the client VR terminal according to the movement start and providing the predicted orientation to a cloud VR server;

a video encoding processing unit encoding a video image according to the predicted orientation through the cloud VR server and receiving the encoded video image; and a video image playback unit playing the encoded video image through the client virtual reality (VR) terminal, wherein the Judder improvement unit obtains an angular velocity through N DoF tracking sensors during the movement start and predicts an orientation of a user's head according to an MTP latency time based on the angular velocity, and wherein the Judder improvement unit detects an angular inflection point of the angular velocity using an angular acceleration through the N DoF tracking sensors, and generates calibrated orientation information of the user's head according to the detection of the angular inflection point.

* * * * *